(12) United States Patent
Boyer

(10) Patent No.: US 9,353,880 B2
(45) Date of Patent: *May 31, 2016

(54) GAS PRESSURE REGULATOR HAVING STACKED INDICATORS

(71) Applicant: Victor Equipment Company, Denton, TX (US)

(72) Inventor: Robert A. Boyer, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,615

(22) Filed: Jul. 2, 2015

(65) Prior Publication Data

US 2015/0300516 A1 Oct. 22, 2015

Related U.S. Application Data

(63) Continuation of application No. 12/721,529, filed on Mar. 10, 2010, now Pat. No. 9,080,727.

(60) Provisional application No. 61/159,232, filed on Mar. 11, 2009.

(51) Int. Cl.

| F17C 13/04 | (2006.01) |
|---|---|
| F16K 27/00 | (2006.01) |
| F16K 31/60 | (2006.01) |
| G05G 1/12 | (2006.01) |
| F16K 17/02 | (2006.01) |

(52) U.S. Cl.
CPC .............. *F16K 27/00* (2013.01); *F16K 17/02* (2013.01); *F16K 31/607* (2013.01); *F17C 13/04* (2013.01); *G05G 1/12* (2013.01); *F17C 2201/0109* (2013.01); *F17C 2201/0119* (2013.01); *F17C 2201/032* (2013.01); *F17C 2201/058* (2013.01); *F17C 2205/0115* (2013.01); *F17C 2205/0196* (2013.01); *F17C 2205/0308* (2013.01); *F17C 2205/0329* (2013.01); *F17C 2205/0332* (2013.01); *F17C 2205/0338* (2013.01); *F17C 2205/0382* (2013.01); *F17C 2205/0388* (2013.01); *F17C 2221/011* (2013.01); *F17C 2223/0123* (2013.01); *F17C 2223/0153* (2013.01); *F17C 2223/033* (2013.01); *F17C 2223/035* (2013.01); *F17C 2227/04* (2013.01); *F17C 2250/043* (2013.01); *F17C 2250/0626* (2013.01); *F17C 2260/011* (2013.01); *F17C 2260/04* (2013.01); *F17C 2270/0545* (2013.01); *Y10T 16/506* (2015.01); *Y10T 137/0318* (2015.04); *Y10T 137/2607* (2015.04); *Y10T 137/7043* (2015.04); *Y10T 137/7062* (2015.04); *Y10T 137/7793* (2015.04); *Y10T 137/8326* (2015.04)

(58) Field of Classification Search
CPC ............. F17C 13/04; F17C 2205/0308; F17C 2205/0338; F17C 2205/0388; F17C 2260/04
See application file for complete search history.

(56) References Cited

U.S. PATENT DOCUMENTS

| 2,946,223 A | * | 7/1960 | Lauer, Jr. ........................ 73/431 |
| 3,958,716 A | * | 5/1976 | Korte ............................. 220/724 |

(Continued)

*Primary Examiner* — Kevin Murphy

(57) ABSTRACT

A gas pressure regulator is provided that includes a body defining a front portion and opposed side portions. A first gas pressure indicator is mounted to a lower end of the front portion of the body, and a second gas pressure indicator mounted to an upper end of the front portion of the body, wherein the first gas pressure indicator and the second gas pressure indicator are stacked in a vertical configuration. Additionally, a pressure adjustment knob is mounted to one of the side portions of the body in one form of the present disclosure.

18 Claims, 15 Drawing Sheets

(56) References Cited

U.S. PATENT DOCUMENTS

| | | | |
|---|---|---|---|
| 5,429,152 A * | 7/1995 | Van Straaten et al. | 137/377 |
| 5,975,121 A * | 11/1999 | Arzenton et al. | 137/377 |
| 6,041,812 A * | 3/2000 | Hilbers | 137/382 |
| 6,886,587 B2 * | 5/2005 | Fancher | 137/382 |
| 9,080,727 B2 * | 7/2015 | Boyer | |

* cited by examiner

GAS PRESSURE REGULATOR HAVING STACKED INDICATORS

CROSS-REFERENCE TO RELATED APPLICATIONS

This application is a Continuation application of pending U.S. patent application Ser. No. 12/721,529, filed Mar. 10, 2010, which is a non-provisional of U.S. Provisional Patent Application Ser. No. 61/159,232, the entirety of which applications is incorporated by reference herein.

FIELD

The present disclosure relates to gas pressure regulators, and in particular, gas pressure regulators for use with liquid or compressed gas cylinders such as, by way of example, gas pressure regulators for oxy-fuel cutting applications.

BACKGROUND

The statements in this section merely provide background information related to the present disclosure and may not constitute prior art.

Gas pressure regulators are employed in a variety of applications in order to reduce and adjust the pressure of gases provided from gas cylinders to downstream equipment. In one common application, oxy-fuel cutting, two gas cylinders are present, one for acetylene gas and another for oxygen gas. As shown in FIG. 1, a gas pressure regulator 1 is secured to the top of a gas cylinder 2, (only one gas pressure regulator and one gas cylinder are shown), which is controlled by an operator in order to properly adjust the pressure of gases for ignition and subsequent cutting. These conventional gas pressure regulators 1 include a cylinder pressure gauge 3, a line pressure gauge 4, and a line pressure adjustment knob 5. Additionally, a cylinder valve knob 6 is mounted to the gas cylinder 2 to open and close the flow of gas from the gas cylinder 2 to the gas pressure regulator 1. The gas pressure regulator 1 also includes other features such as a relief valve 7 and outlet 8 as shown. With these conventional gas pressure regulators and the means by which they are mounted to the gas cylinder 2, there are several locations that are susceptible to damage, as shown, if the gas cylinder 2 were, for example, to fall over or be mishandled during operation.

These conventional gas pressure regulators have also maintained substantially the same design for decades, yet have carried their overall bulky character and lack of robustness and ergonomic features over time. Improved gas pressure regulators that are safer, easier to use, and which provide a more compact package to the end user are continually desirable in the art of gas regulation, particularly regulation of combustible or flammable compressed gas stored in gas cylinders, including gas cylinders for oxy fuel cutting.

SUMMARY

In one form of the present disclosure, a gas pressure regulator is provided that comprises a body defining a front portion and opposed side portions, a first gas pressure indicator mounted to a lower end of the front portion of the body, and a second gas pressure indicator mounted to an upper end of the front portion of the body. The first gas pressure indicator and the second gas pressure indicator are stacked in a vertical configuration, and a pressure adjustment knob is mounted to one of the side portions of the body.

In another form, a gas pressure regulator adapted for being mounted to a gas cylinder is provided. The gas pressure regulator comprises a body defining a front portion and opposed side portions, a first gas pressure indicator mounted to a lower end of the front portion of the body, and a second gas pressure indicator mounted to an upper end of the front portion of the body, wherein the first gas pressure indicator and the second gas pressure indicator are stacked in a vertical configuration. A bonnet is mounted to an exterior portion of the body, and a pressure adjustment knob is mounted to one of the side portions of the body, proximate the bonnet.

In still another form, a gas pressure regulator adapted for being mounted to a gas cylinder is provided. The regulator comprises a body defining a front portion and opposed side portions, a first gas pressure indicator mounted to a lower end of the front portion of the body, and a second gas pressure indicator mounted to an upper end of the front portion of the body, wherein the first gas pressure indicator and the second gas pressure indicator are stacked in a vertical configuration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 15:
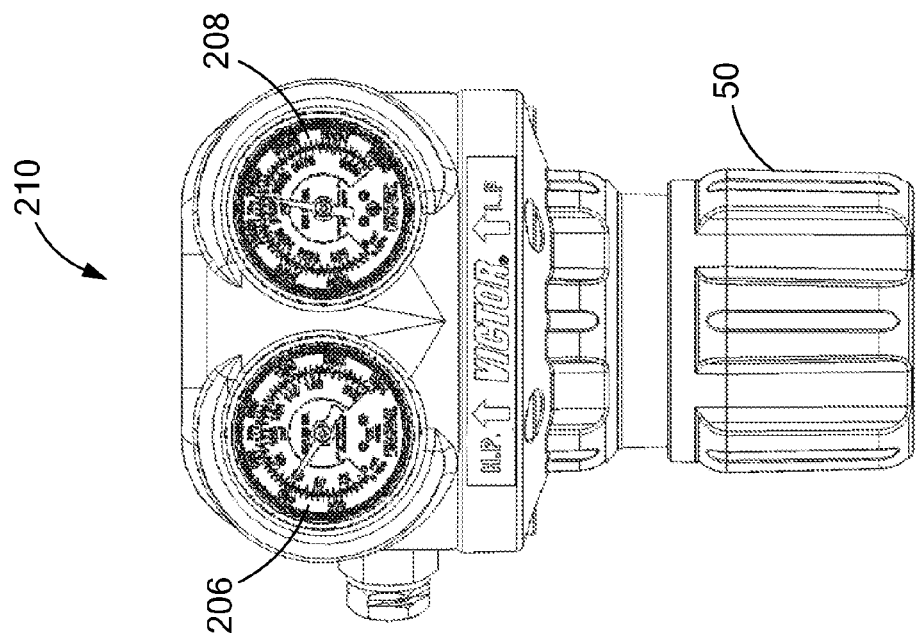
Figure 16:
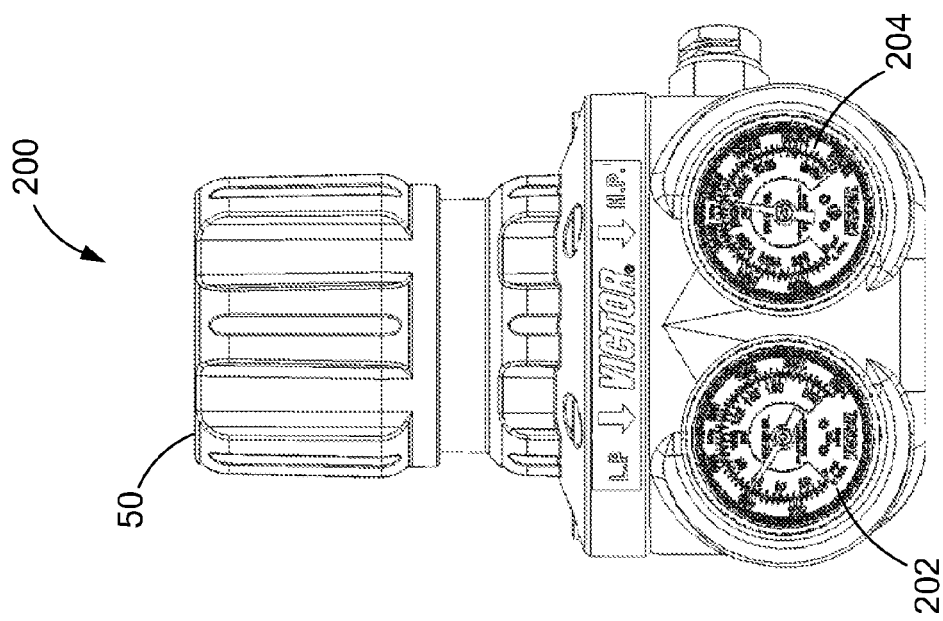

FIG. 15 is a front view illustrating an alternate form of the gas pressure regulator having a pressure adjustment knob facing upwards and constructed in accordance with the teachings of the present disclosure; and FIG. 16 is a front view illustrating another form of the gas pressure regulator having a pressure adjustment knob facing downwards and constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to FIGS. 2-8, a gas pressure regulator in accordance with the teachings of the present disclosure is illustrated and generally indicated by reference numeral 20. The gas pressure regulator 20 comprises a body 22 defining a front portion 24 and opposed side portions 26, and 28, respectively. A first gas pressure indicator 30, in the form of an analog gauge in one form of the present disclosure, is mounted to a lower end 32 of the front portion 24 of the body 22. A second gas pressure indicator 40, also in the form of an analog gauge in this form of the present disclosure, is mounted to an upper end 42 of the front portion 24 of the body 22. As shown, the first gas pressure indicator 30 and the second gas pressure indicator 40 are advantageously stacked in a vertical configuration and off to the side relative to a gas cylinder 2 (shown dashed in FIG. 5). It should be understood that the gas cylinder 2 is merely exemplary of a variety of gas delivery systems in which the gas pressure regulator 20 according to the present disclosure may be employed. For example, other gas delivery systems may include gaslines or gas stations. As such, the gas pressure regulator 20 as set forth herein has applicability to a variety of gas delivery systems and not merely gas cylinders. Moreover, the "gas" cylinder 2 should not be construed as being limited to compressed gas only, but may also include liquids and other forms of fluids while remaining within the scope of the present disclosure.

As further shown, a pressure adjustment knob 50 is mounted to one of the side portions 28 of the body 22. In this form, the gas pressure regulator 20 is mounted on a gas cylinder 2 (FIG. 5) such that the pressure adjustment knob 50 extends horizontally relative to a longitudinal axis X of the gas cylinder 2. Additional configurations of the pressure adjustment knob 50 relative to the gas cylinder 2 are described in greater detail below. Further, the pressure adjustment knob 50 in one form comprises a textured outer surface for ease of use/grip, which are in the form of ribs 52 and scallops 54 as shown.

Figure 5:
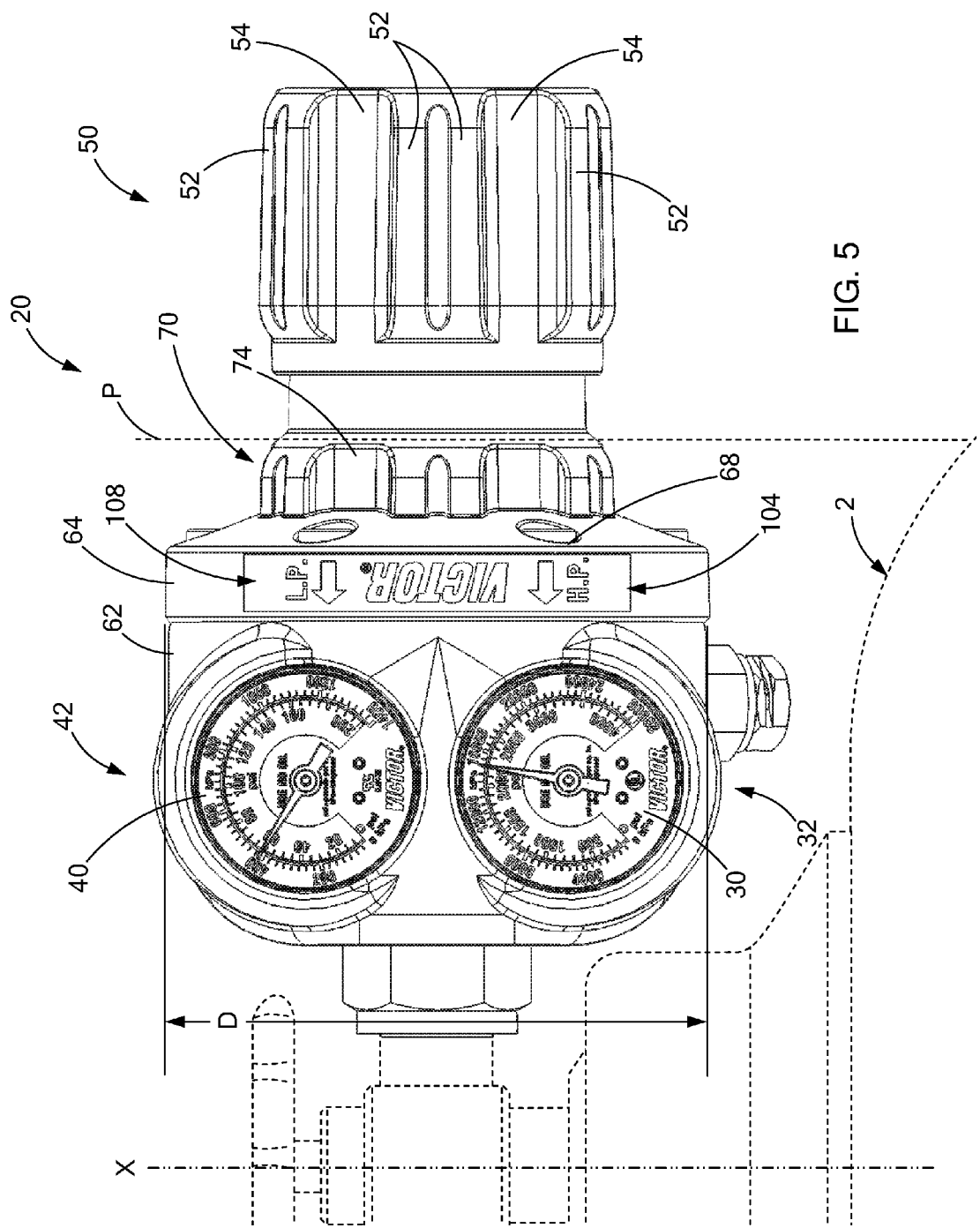
FIG. 5 is a front view of the gas pressure regulator in accordance with the teachings of the present disclosure.

As also shown in FIG. 5, elements of the gas pressure regulator 20 are disposed within, (or a substantial portion of the elements of the gas pressure regulator 20 are disposed within), the outer profile P, or an extension of the outer wall of the gas cylinder 2, which reduces the number of impact points on the gas pressure regulator 20 should the gas cylinder 2 fall over or be mishandled during use. Generally, the elements disposed within the profile P are those which effect the ability to maintain system pressure or integrity. Therefore, the gas pressure regulator 20 is compact and more robust than traditional gas pressure regulators in the art. Additional robust features of the gas pressure regulator 20 are described in greater detail below.

As further shown, the gas pressure regulator 20 also comprises a body guard 62 and a bonnet 64. It should be understood that although a two separate pieces are shown for the body guard 62 and the bonnet 64, these two components may alternately be a single, unitized piece, or be multiple pieces while falling within the scope of the present disclosure. The bonnet 64 in one form is a zinc-aluminum alloy and replaces traditional brass materials, and the body guard 62 in one form is a medium impact ABS (acrylonitrile butadiene styrene). However, it should be understood that other materials, including brass, that are robust and can withstand impact damage during operation may also be employed while remaining within the scope of the present disclosure.

Referring to the body guard 62 in FIGS. 2, and 5-8, the contour of this body guard 62 is configured such that the pressure indicators 30 and 40 are recessed within apertures 65, behind ridges 66, and the front profile of the guard 62. Furthermore, the pressure indicators 30 and 40 are located within the outer diameter "D" of the bonnet 64 as best shown in FIG. 5. As such, the pressure indicators 30 and 34 are more protected from impact damage, whether or not the body guard 62 is installed onto the body 22.

The bonnet 64 in one form is fastened to the body 22 with bolts 68. As such, a shorter design profile for the gas pressure regulator 20 is achieved. It should be understood that the bonnet 64 may be secured to the body 22 using other approaches such as a snap-on design or threads, by way of example. As further shown, the bonnet 64 also includes a contoured outer surface 70 proximate the pressure adjustment knob 50, which are in the form of ribs 72 and scallops 74, similar to the pressure adjustment knob 50.

Figure 4:
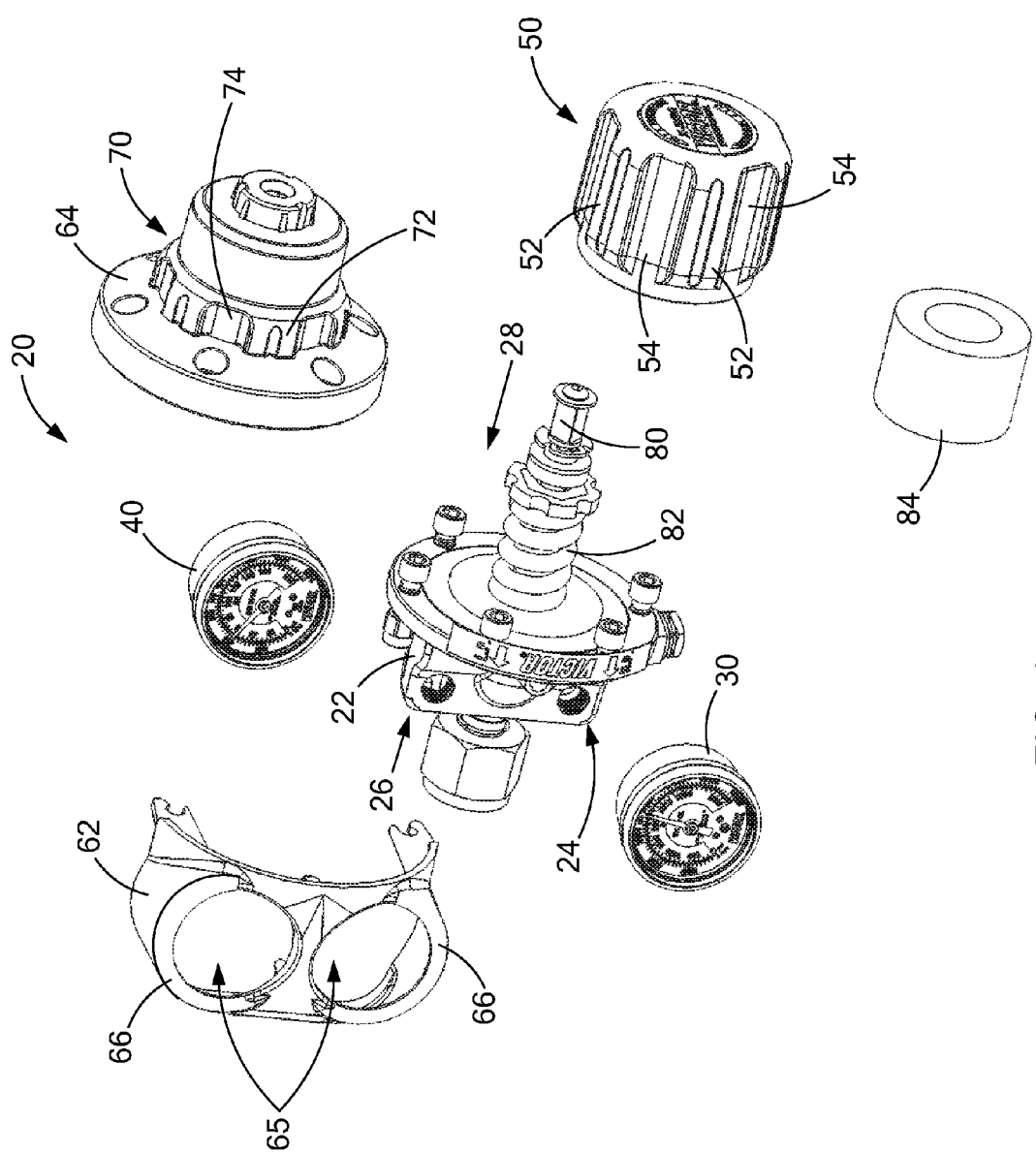
FIG. 4 is a partial exploded view of the gas pressure regulator in accordance with the teachings of the present disclosure.
Figure 9:
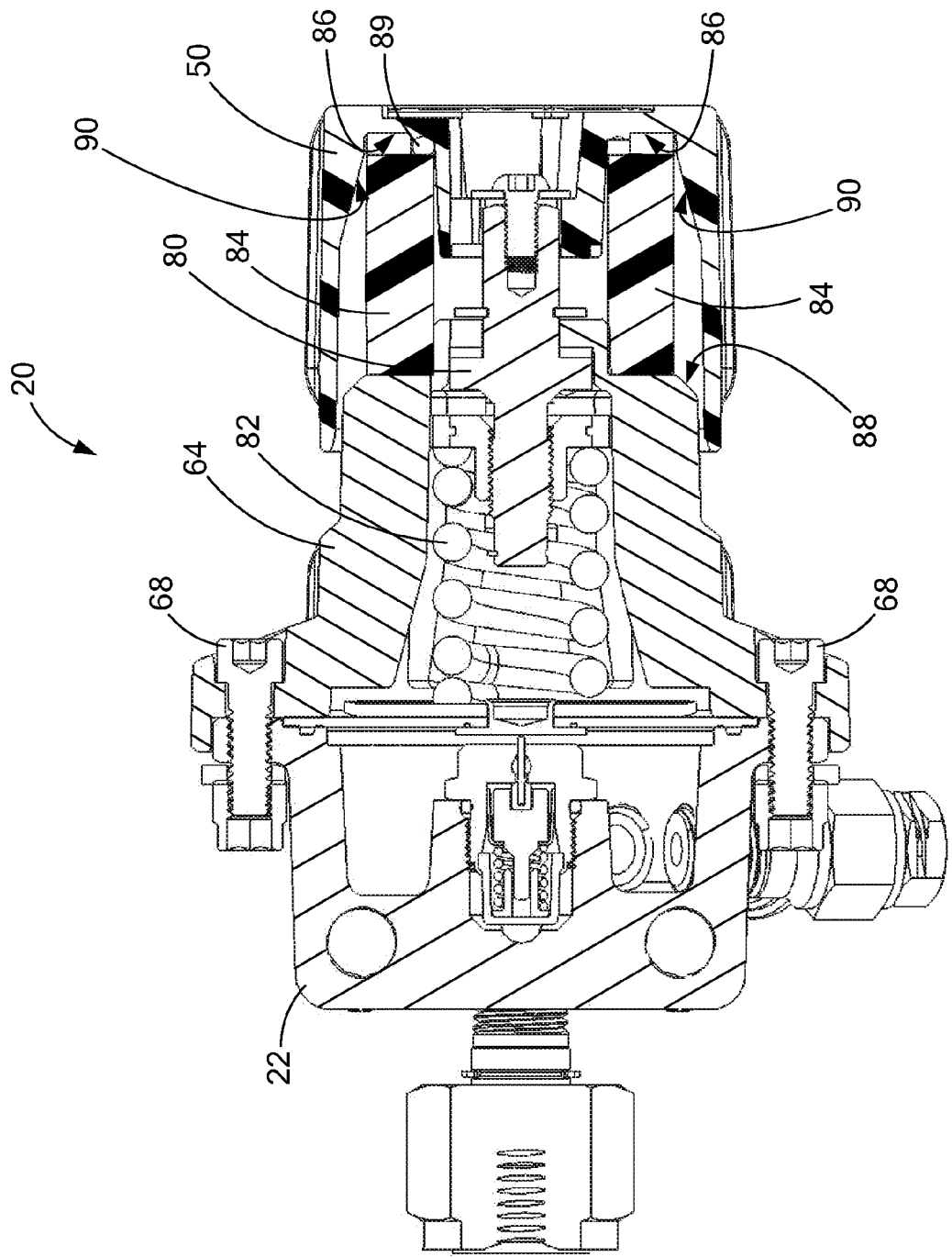
FIG. 9 is a cross-sectional view, taken along line 8-8 of FIG. 8, of the gas pressure regulator, illustrating one form of an energy absorbing device constructed in accordance with the teachings of the present disclosure.

Referring now to FIGS. 4 and 9, the pressure adjustment knob 50 is mounted to the body 22 by an adjustment member 80 and compression spring 82 that are disposed within the bonnet 64 as shown. An energy absorbing device in the form of a resilient member 84 is disposed between the pressure adjustment knob 50 and the body 22, and more specifically, abuts an interior recess 86 of the pressure adjustment knob 50 and an exterior lip 88 of the bonnet 64. Note that the pressure adjustment knob 50 in this form is not fixed to the resilient member 84. In one form, a slip ring 89 is disposed between the resilient member 84 and an interior portion of the pressure adjustment knob 50 as shown, which reduces friction between the pressure adjustment knob 50 and the resilient member 84. It should be understood that other approaches for reducing this friction, such as lubricants, may also be employed while remaining within the scope of the present disclosure.

Figure 10:
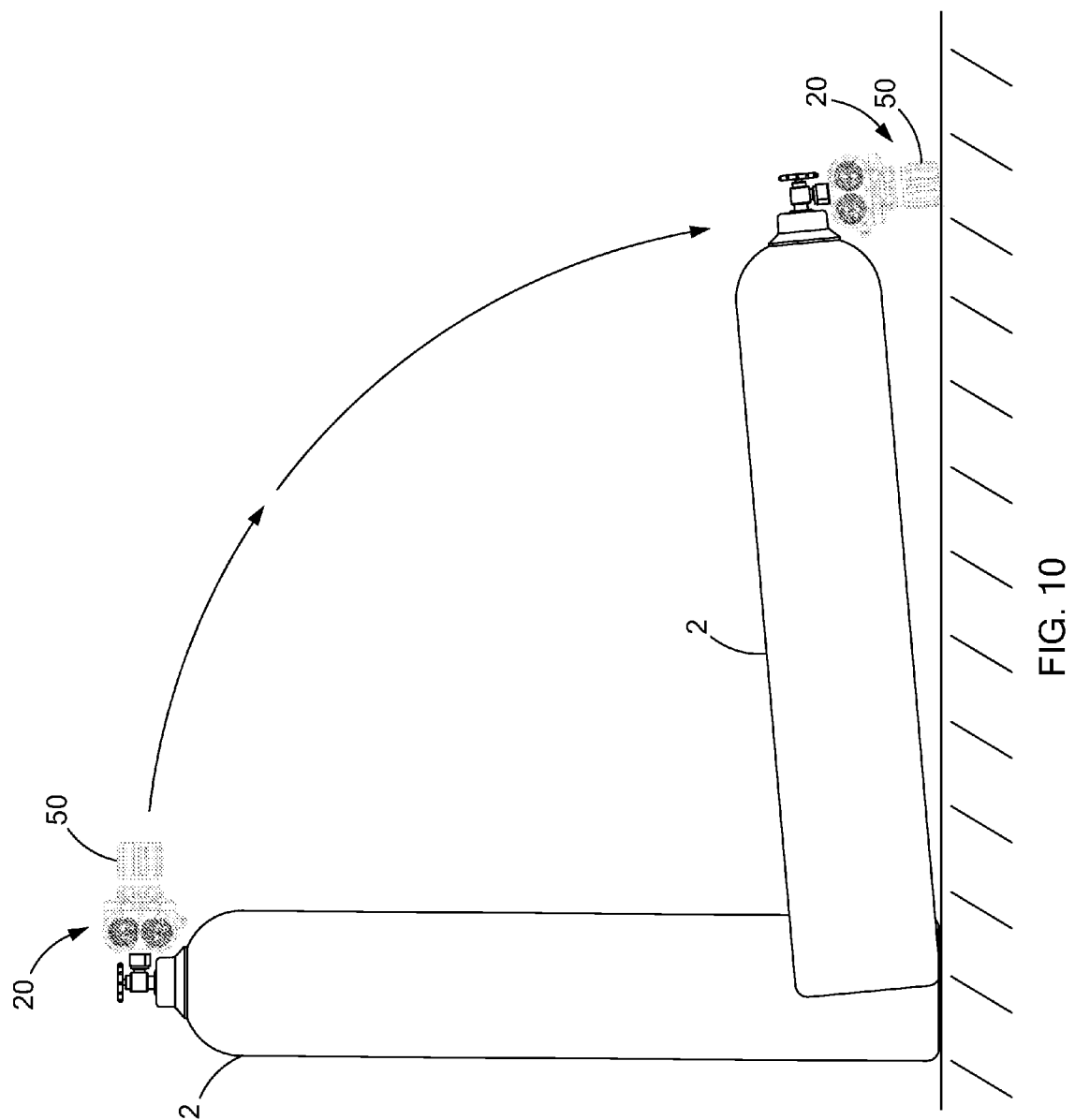
FIG. 10 is a front view illustrating the gas pressure regulator mounted to a gas cylinder and the gas pressure regulator impacting the ground or surrounding environment as a result of the gas cylinder inadvertently falling.

The resilient member 84 defines a material that is capable of deforming, or compressing, and absorbing energy when the pressure adjustment knob 50 experiences impact loads. For example, in one form, the resilient member 84 is a high strength urethane material, however, it should be understood that other materials that compress and/or deform to absorb energy from impacts loads may also be employed while remaining within the scope of the present disclosure. Such impact loading is illustrated in FIG. 10, where the cylinder 2 falls in the direction of the arrows, and the pressure adjustment knob 50 directly impacts the ground, or the surrounding environment. When this impact occurs, which may be from a variety of angles or orientations other than that shown in FIG.

10, the impact loads are transferred from the pressure adjustment knob 50 to the resilient member 84, which deforms and thus absorbs much of the energy from such an impact. As a result, a more robust gas pressure regulator 20 is provided.

Figure 11:
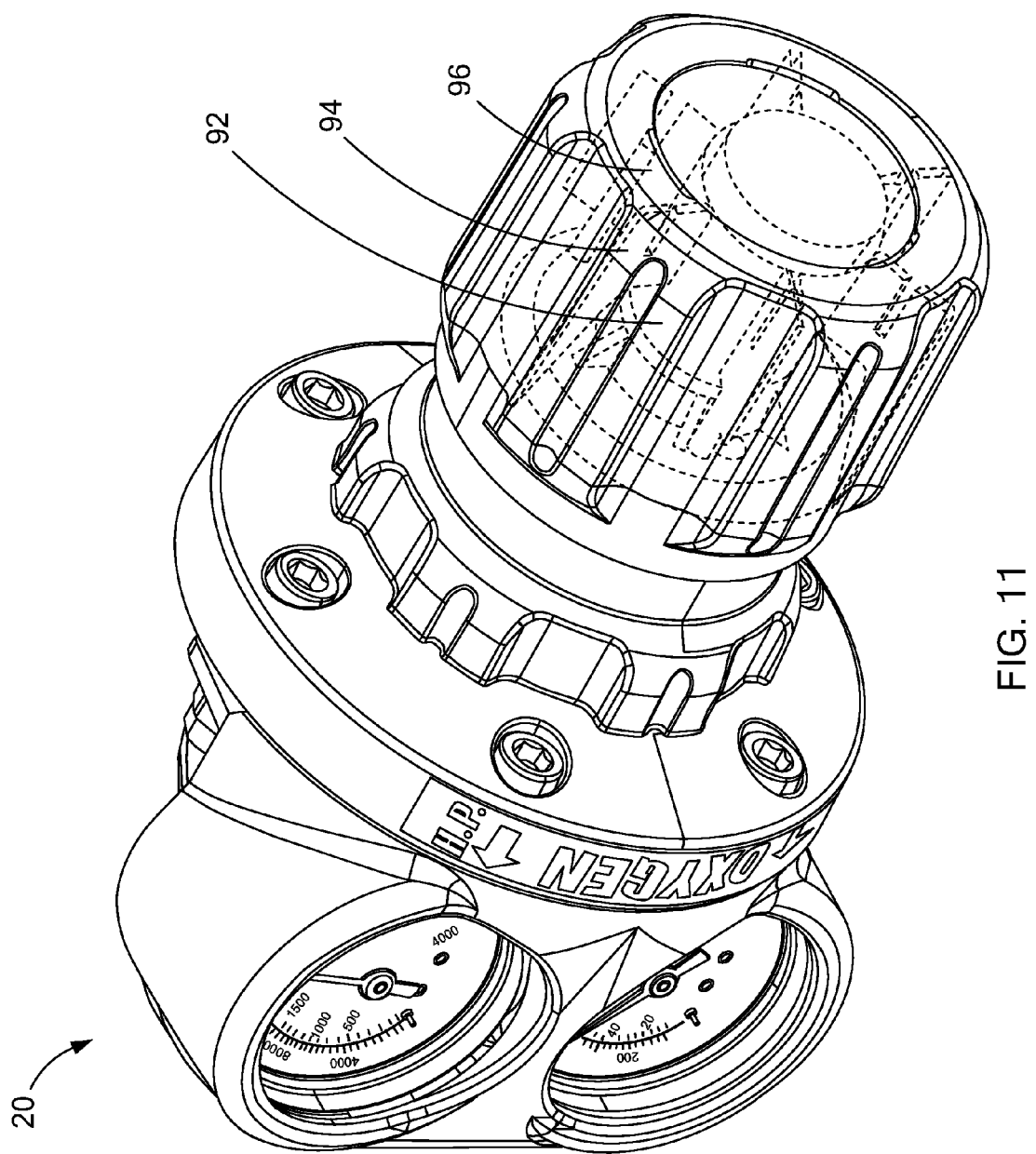
FIG. 11 is a perspective view of another form of an energy absorbing device for a gas pressure regulator constructed in accordance with the teachings of the present disclosure.
Figure 12:
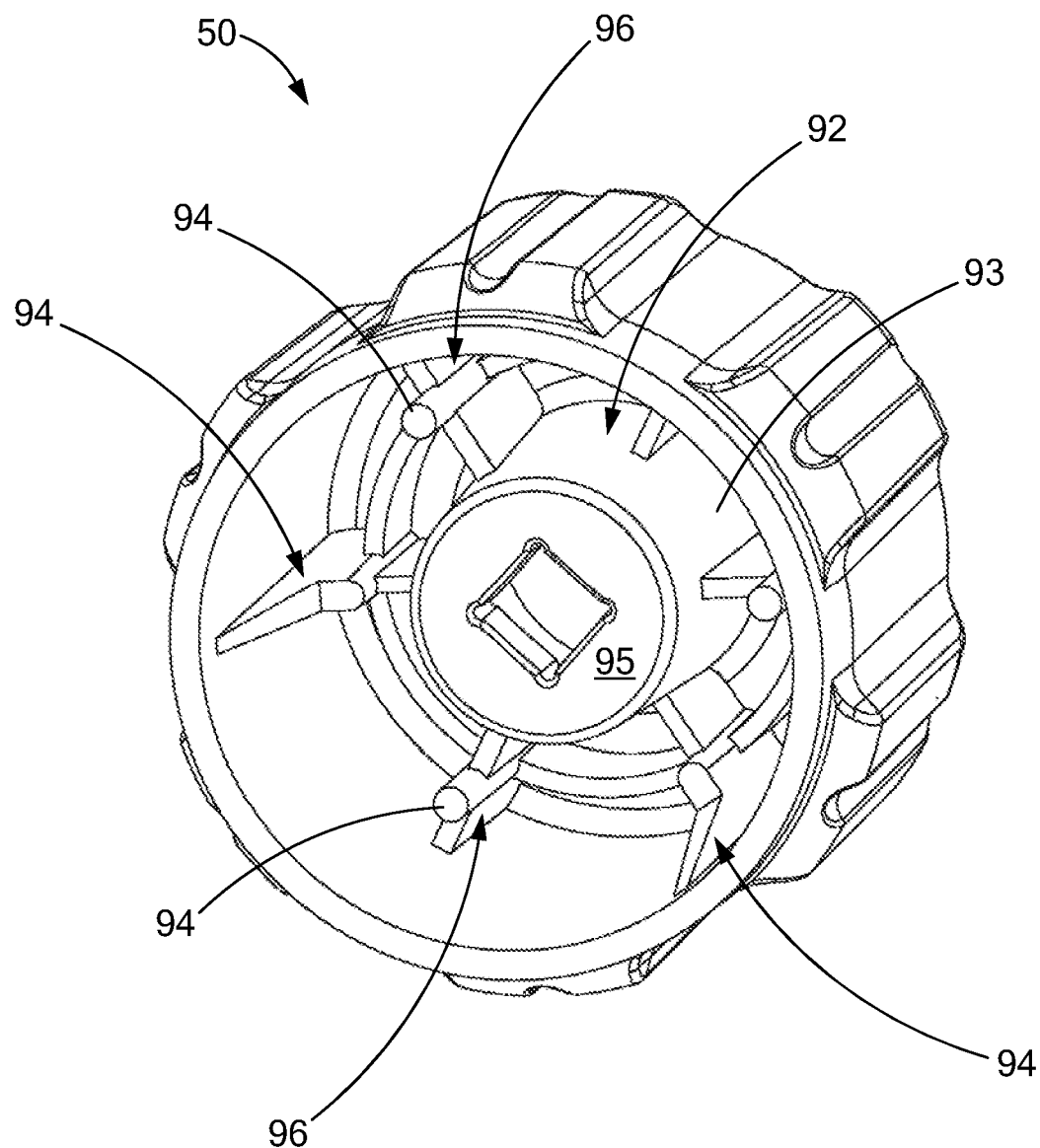
FIG. 12 is a perspective view of an interior portion of the pressure adjustment knob and a series of progressive energy absorbing members constructed in accordance with the teachings of the present disclosure.
Figure 13:
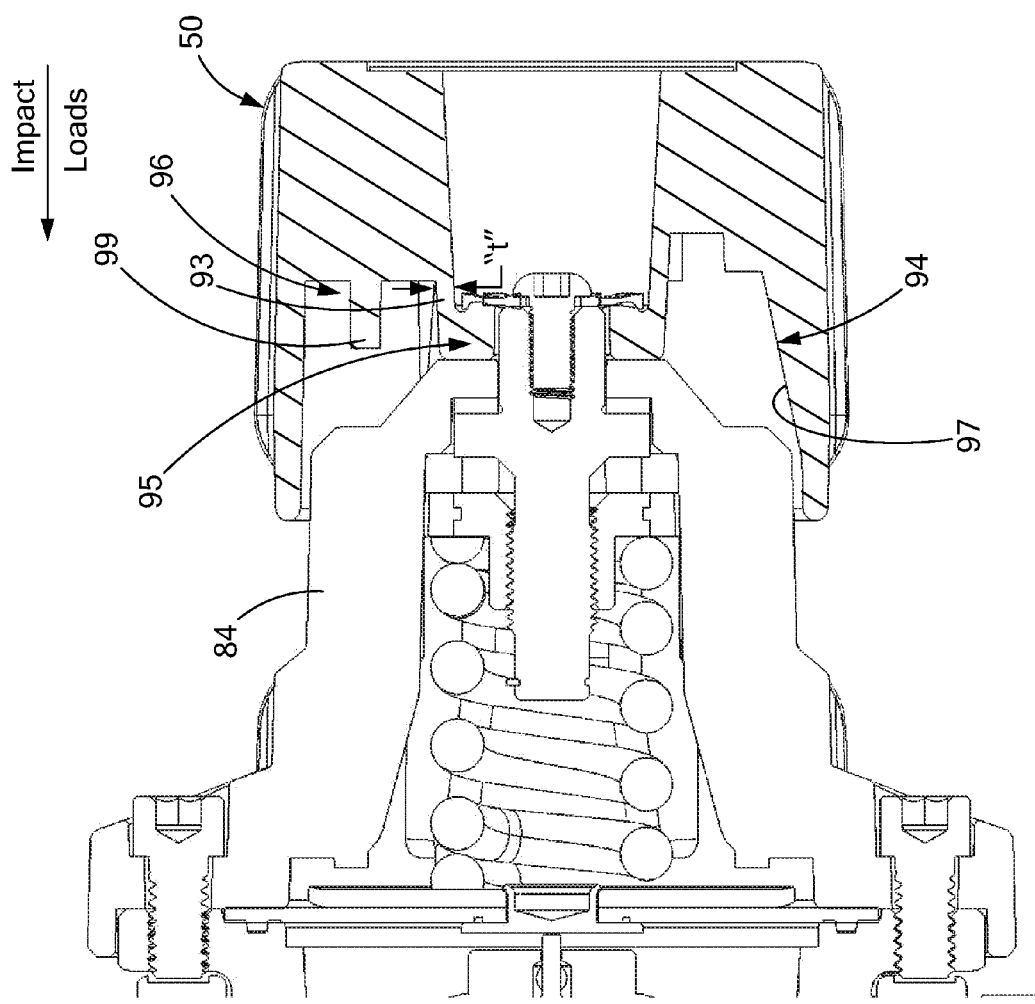
FIG. 13 is a cross-sectional view of the series of progressive energy absorbing members within the pressure adjustment knob in accordance with the teachings of the present disclosure.

Referring to FIGS. 11-13, another form of an energy absorbing device for use when the pressure adjustment knob 50 experience impact loads is illustrated and generally as a series of members 92, 94, and 96. Generally, the members 92, 94, and 96 progressively deform and slow the velocity of the pressure adjustment knob 50 under impact loads. In principle, the further the distance traveled during impact, the lower the impact force becomes. In the present invention, the distance traveled during impact is the distance the knob 50 deforms/crushes when impact occurs. More specifically, the first stage member 92 defines an arcuate wall 93 that extends along an interior central portion of the pressure adjustment knob 50, along with an end portion 95 as shown. The wall 93 defines a specific thickness "t" as shown in FIG. 13 such that under impact loads, the end portion 95 contacts the bonnet 84 and when the loads reach a certain limit, the wall 93 buckles and fails. Next, the second stage member 94 defines a plurality of angled walls 97 positioned around an inner periphery of the pressure adjustment knob 50 as shown. Under impact loads, after the wall 93 of first stage member 92 fails as set forth above, the angled walls 97 next move closer to the bonnet 84 with the continued movement of the pressure adjustment knob 50. As the angled walls 97 engage the bonnet 84, they progressively wedge themselves tighter onto the bonnet 84 such that the pressure adjustment knob 50 tends to deform outwards under the wedging action. This wedging and deformation further slows the velocity of the pressure adjustment knob 50 under impact loads. Next, the third stage member 96 defines a plurality of pegs 99 extending from members 96 as shown. Under the impact loads, after the angled walls 97 have wedged themselves onto the bonnet 84 as set forth above, the pegs 99 will then engage the bonnet 84 to further slow the velocity of the pressure adjustment knob 50. After the pegs 99 engage the bonnet 84, the members 96 then deform and further slow the velocity of the pressure adjustment knob 50. Accordingly, through this series of progressive engagement of the members 92, 94, and 96 with the bonnet 84, the energy absorbing device causes the pressure adjustment knob 50 to internally crush and slide over the bonnet 84 under high impact loads. Such loads may be, by way of example, on the order of about 8,000-9,000 pounds-force. With the innovative disclosure provided herein, these loads can be absorbed by the pressure adjustment knob 50 without causing serious damage to the gas pressure regulator 20, thereby providing a more robust design. Additionally, potential damage to the gas cylinder 2, or gas delivery system, is mitigated.

Although the series of members 92, 94, and 96 are shown integrally formed with the pressure adjustment knob 50, it should be understood that separate pieces may be employed while remaining within the scope of the present disclosure. Additionally, the specific number and configurations of the members 92, 94, and 96 are merely exemplary and should not be construed as limiting the scope of the present disclosure.

It should be understood that the specific energy absorbing devices, namely, the resilient member 84 and the series of member 92, 94, and 96, are merely exemplary and are not intended to limit the scope of the present disclosure. A variety of energy absorbing devices may be employed with the pressure adjustment knob 50, whether internally as illustrated and described, or externally, while remaining within the spirit and intent of the present disclosure. As such, the specific energy absorbing devices illustrated and described herein are not limiting as to the scope of the present disclosure.

Figure 1:
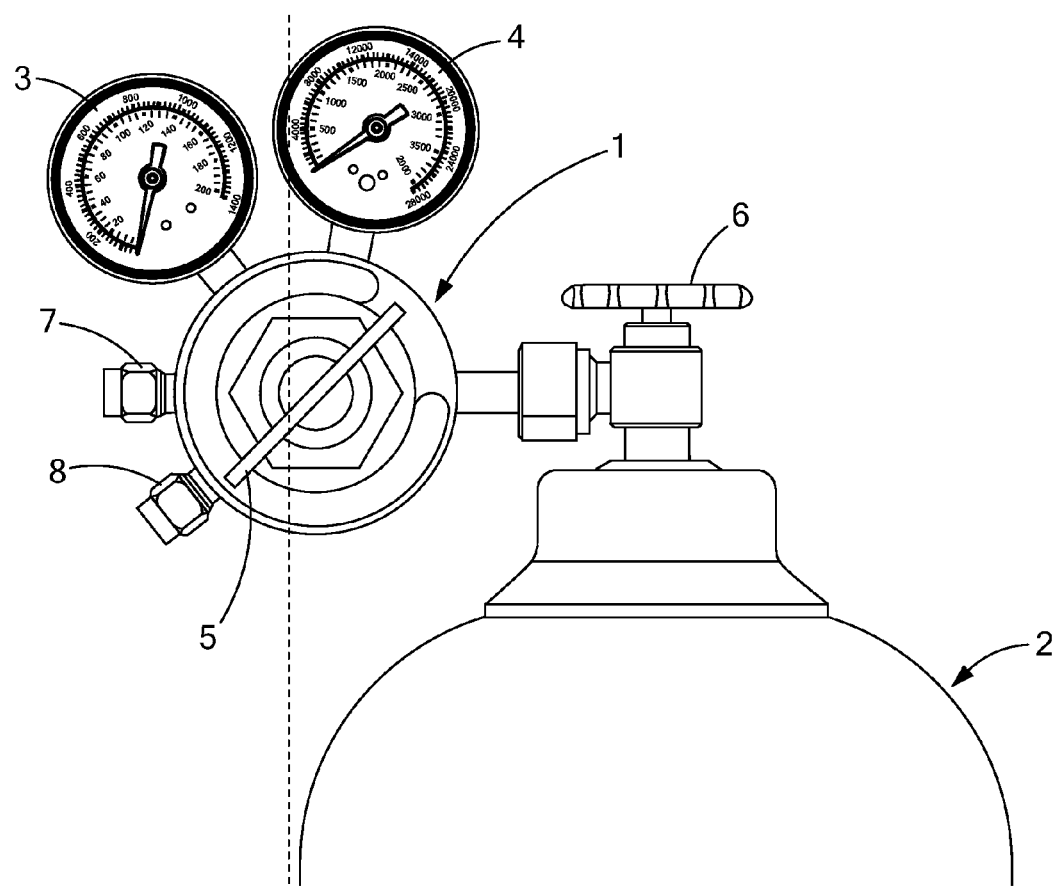
FIG. 1 is a front view of a prior art gas pressure regulator mounted to a gas cylinder.
Figure 2:
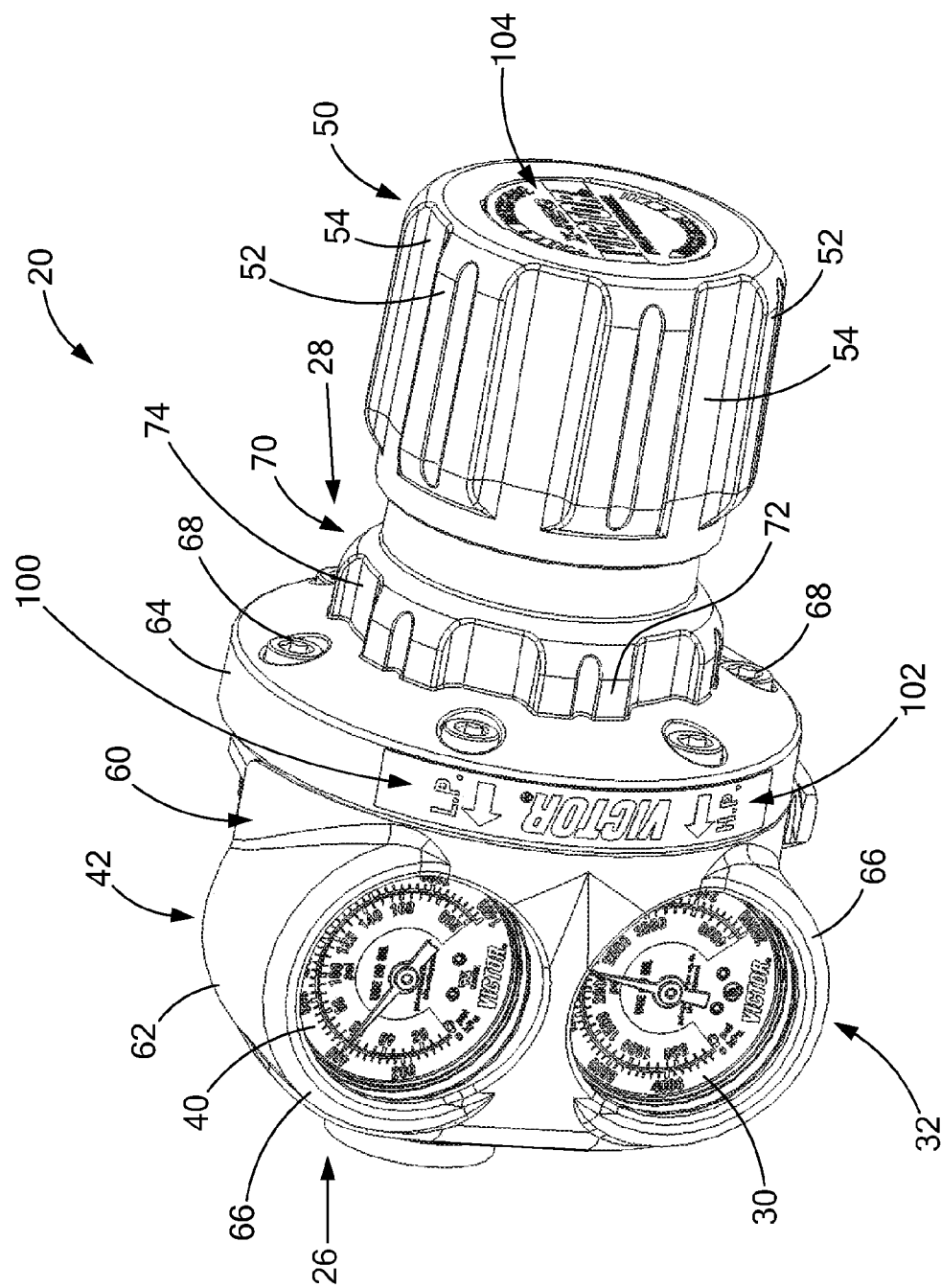
FIG. 2 is a front perspective view of a gas pressure regulator constructed in accordance with the teachings of the present disclosure.
Figure 6:
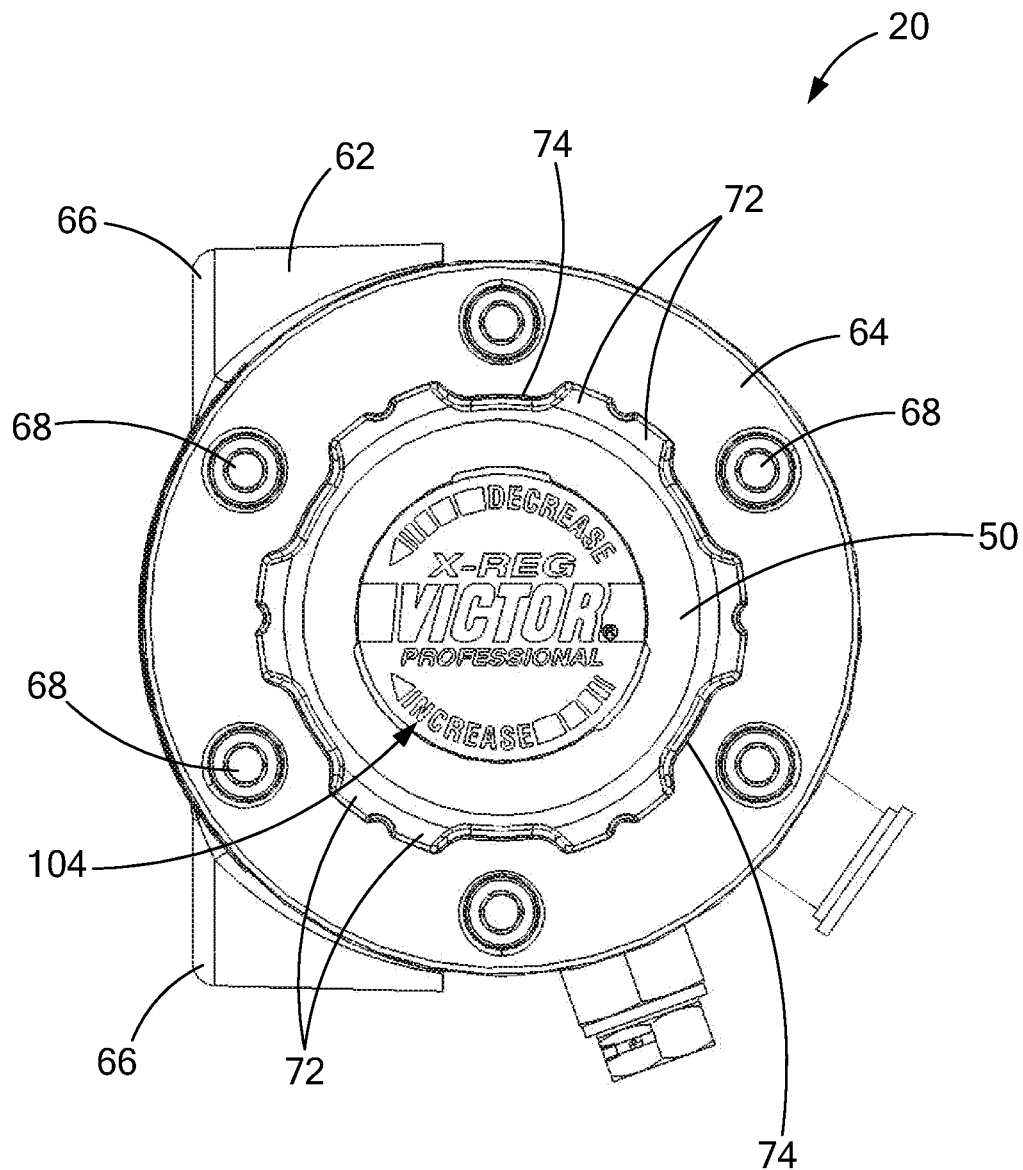
FIG. 6 is a right side view of the gas pressure regulator in accordance with the teachings of the present disclosure.
Figure 7:
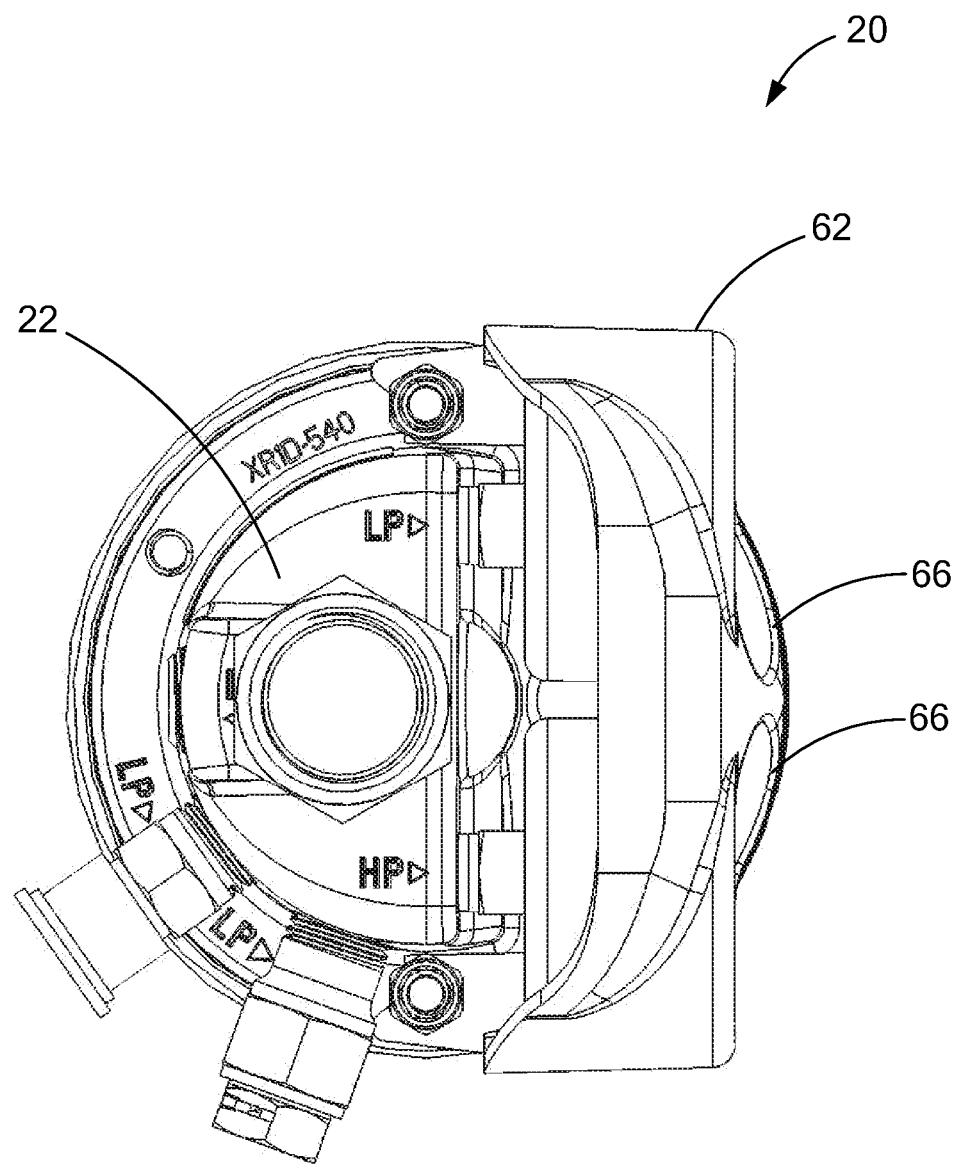
FIG. 7 is a left side view of a gas pressure regulator in accordance with the teachings of the present disclosure.
Figure 8:
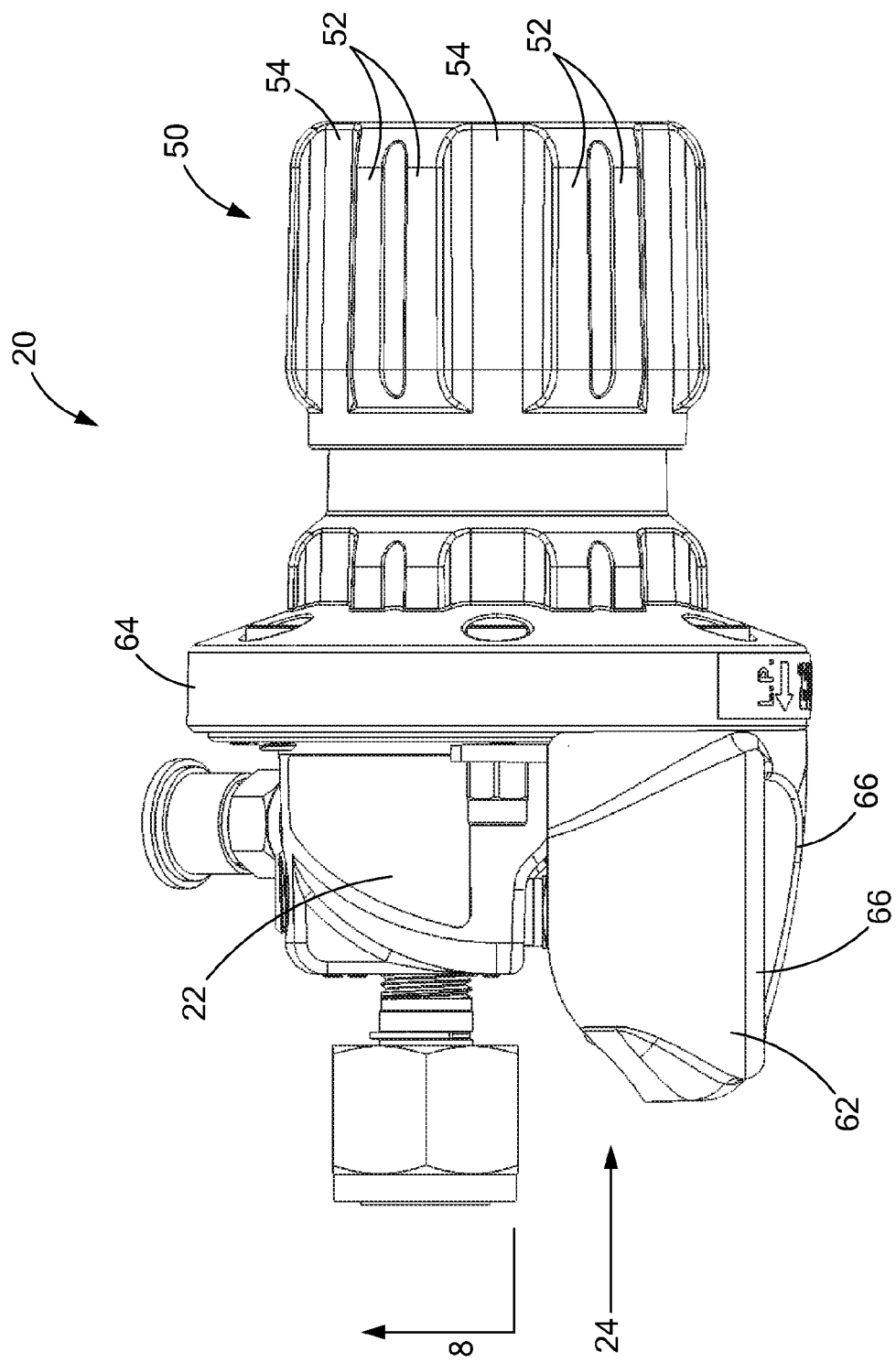
FIG. 8 is a top view of a gas pressure regulator in accordance with the teachings of the present disclosure.

As best shown in FIGS. 2, 5 and 6, both the bonnet 64 and the pressure adjustment knob 50 include various indicia to provide information to the user as to where and how certain functions operate. For example, on the bonnet 64, a low pressure indicia "L.P." and arrow 100 are shown near the second gas pressure indicator 40 to indicate that this pressure indicator is for low pressure, or pressure of the gas exiting the regulator. Similarly, a high pressure indicia "H.P." and arrow 102 are shown near the first gas pressure indicator 30 to indicate that this pressure indicator is for high pressure, or pressure of the gas within the gas cylinder 2. On the pressure adjustment knob 50, the indicia 104 provides information that a clockwise rotation of the knob 50 increases pressure, and a counterclockwise rotation of the knob 50 decreases pressure. It should be understood that other types of indicia may be provided, including but not limited to LEDs to indicate unsafe pressure levels, while remaining within the scope of the present disclosure.

Figure 3:
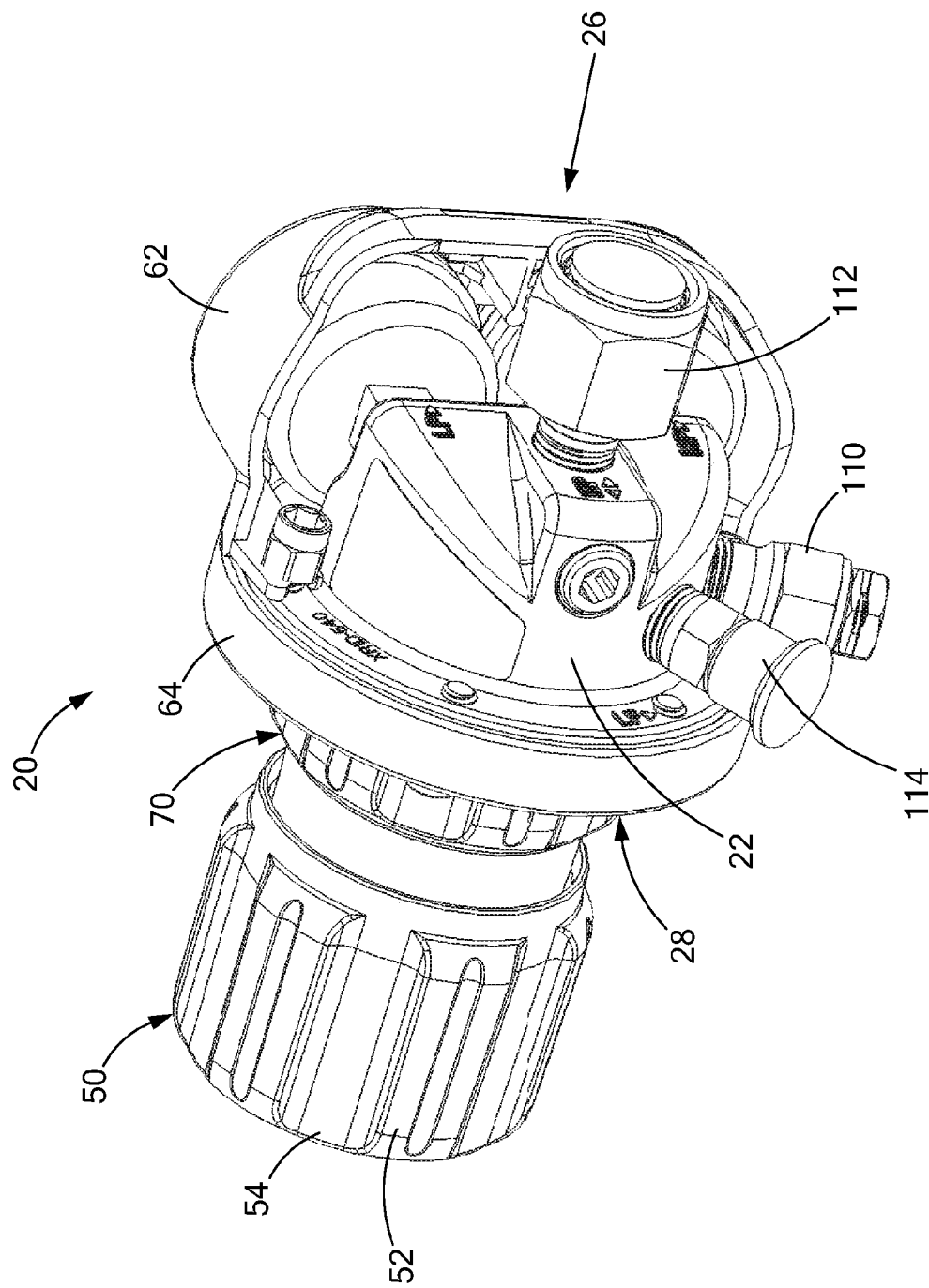
FIG. 3 is a rear perspective view of the gas pressure regulator in accordance with the teachings of the present disclosure.

As further shown in FIG. 3, the body 22 comprises a plurality of fittings 110, 112, and 114. Fitting 110 is a safety relief valve. Fitting 112 is adapted for mounting the gas pressure regulator 20 to the gas cylinder 2 (see FIG. 5). Fitting 114 is an outlet connection, i.e. to a hose that connects to the downstream equipment. Advantageously, the outlet fitting 114 is directed down and out the back of the gas pressure regulator body 22, which places hose-related hazards away from an operator. It should be understood that any number and/or configurations of fittings may be employed in accordance with the teachings of the present disclosure, and thus the fittings illustrated and described herein are merely exemplary and should not be construed as limiting the scope of the present disclosure.

Figure 14:
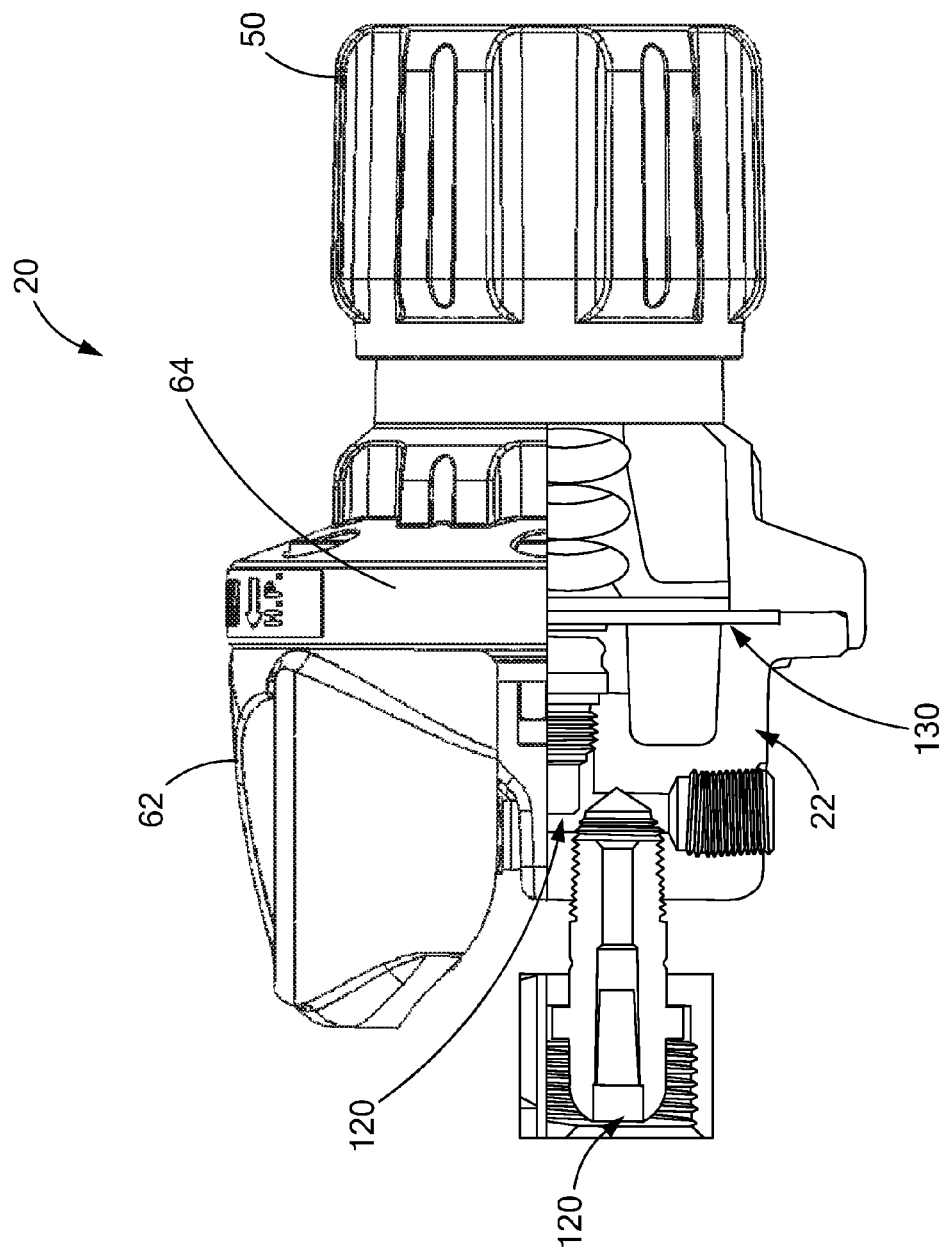
FIG. 14 is a partial bottom cross-sectional view of the gas pressure regulator in accordance with the teachings of the present disclosure.

Referring now to FIG. 14, inlet filters 120 are provided as shown to protect internal components of the gas pressure regulator 20, and in some forms of the present disclosure double seat protection with two stages of inlet filtration. Additionally, a diaphragm 130 is provided as shown, which in one form is a high-strength fabric reinforced neoprene material for standard industrial applications. For high purity or liquid applications, a stainless steel material is employed for the diaphragm in another form of the present disclosure.

As shown in FIGS. 15 and 16, alternate forms for the gas pressure regulator are illustrated and generally indicated by reference numerals 200 and 210. Gas pressure regulator 200 is mounted on a gas cylinder (not shown) with a rear station inlet such that the pressure adjustment knob 50 is vertical and facing upwards. In this form, although the gas pressure indicators 202 and 204 are reading in a horizontal, or linear configuration, this should be understood and construed as a "vertical configuration" as this term is being used in the present application. Alternately, the gas pressure regulator 210 is mounted on a gas cylinder (not shown) with a rear station inlet such that the pressure adjustment knob 50 is vertical and facing downwards. Similarly, although the gas pressure indicators 206 and 208 are reading in a horizontal, or linear configuration, this should be understood and construed as a "vertical configuration" as this term is being used in the present application. These and other mounting configurations shall be construed as falling within the scope of the present disclosure.

It should be noted that the disclosure is not limited to the embodiment described and illustrated as examples. For example, the gas pressure regulator according to the teachings of the present disclosure is not limited to oxy-fuel cutting applications and may be employed in other applications that could reap the benefits of the unique designs disclosed hereunder. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A gas pressure regulator comprising:
   a body defining a front portion and opposed side portions;
   a first gas pressure indicator and a second gas pressure indicator each mounted to the front portion of the body;
   a body guard mounted to the body, the body guard defining a contour and apertures within which the first gas pressure indicator and the second gas pressure indicator are recessed;
   a pressure adjustment knob mounted to one of the opposed side portions of the body, the pressure adjustment knob being positioned outside of the body guard; and
   a fitting extending from another of the opposed side portions of the body.

2. The gas pressure regulator according to claim 1, wherein the gas pressure regulator is mounted on a gas delivery system such that the pressure adjustment knob is horizontal.

3. The gas pressure regulator according to claim 1, wherein the gas pressure regulator is mounted on a gas delivery system such that the pressure adjustment knob is vertical and facing upwards.

4. The gas pressure regulator according to claim 1, wherein the gas pressure regulator is mounted on a gas delivery system such that the pressure adjustment knob is vertical and facing downwards.

5. The gas pressure regulator according to claim 1, wherein the pressure adjustment knob comprises a textured outer surface.

6. The gas pressure regulator according to claim 1, wherein the pressure adjustment knob comprises a proximal face portion defining operating indicia.

7. The gas pressure regulator according to claim 1 further comprising a bonnet mounted to an exterior portion of the body.

8. The gas pressure regulator according to claim 7, wherein the first and second gas pressure indicators are located within a vertical height of an outer diameter of the bonnet.

9. The gas pressure regulator according to claim 7, wherein at least a portion of the bonnet proximate the pressure adjustment knob comprises a textured outer surface.

10. The gas pressure regulator according to claim 7, wherein the bonnet comprises an exterior portion having operational indicia.

11. The gas pressure regulator according to claim 7, wherein the bonnet is a single unitized piece.

12. The gas pressure regulator according to claim 1 the fitting mounted to a portion of the body for securing the gas pressure regulator to a gas delivery system.

13. The gas pressure regulator according to claim 1 further comprising a plurality of fittings mounted to portions of the body for securing the gas pressure regulator to a gas delivery system in a plurality of positions.

14. The gas pressure regulator according to claim 1 further comprising an outlet fitting disposed on the body, the outlet fitting configured in a downward position.

15. A gas pressure regulator adapted for being mounted to a gas cylinder, the gas pressure regulator comprising:
   a body defining a front portion and opposed side portions;
   a first gas pressure indicator mounted to a lower end of the front portion of the body;
   a second gas pressure indicator mounted to an upper end of the front portion of the body;
   a body guard mounted to the body, the body guard defining a contour and apertures within which the first gas pressure indicator and the second gas pressure indicator are recessed;
   a pressure adjustment knob mounted to one of the opposed side portions of the body, the pressure adjustment knob being positioned outside of the body guard; and
   a fitting extending from another of the opposed side portions of the body.

16. The gas pressure regulator according to claim 15 further comprising a plurality of fittings mounted to portions of the body for securing the gas pressure regulator to a gas delivery system in a plurality of positions.

17. The gas pressure regulator according to claim 15 further comprising a bonnet coupled to the pressure adjustment knob.

18. A gas pressure regulator adapted for being mounted to a gas cylinder, the regulator comprising:
   a body defining a front portion and a set of opposed side portions;
   a first gas pressure indicator and a second gas pressure indicator each mounted to the front portion of the body;
   a body guard mounted to the body, the body guard defining apertures within which the first gas pressure indicator and the second gas pressure indicator are recessed;
   a pressure adjustment knob mounted to one of the set of opposed side portions of the body, the pressure adjustment knob disposed exterior to the body guard; and
   a fitting extending from another of the set of opposed side portions of the body.

* * * * *